United States Patent
Huang et al.

(10) Patent No.: US 10,045,166 B2
(45) Date of Patent: Aug. 7, 2018

(54) METHOD AND DEVICE FOR IDENTIFYING SHORT MESSAGES FROM PSEUDO BASE STATIONS

(71) Applicant: Beijing Xiaomi Mobile Software Co., Ltd., Haidian Street, Beijing (CN)

(72) Inventors: Qianhong Huang, Beijing (CN); Hengbin Cui, Beijing (CN); Laijun Yan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/602,840

(22) Filed: May 23, 2017

(65) Prior Publication Data

US 2017/0347249 A1    Nov. 30, 2017

(30) Foreign Application Priority Data

May 24, 2016  (CN) .......................... 2016 1 0350262

(51) Int. Cl.
*H04W 24/08* (2009.01)
*H04W 4/14* (2009.01)
*H04W 88/08* (2009.01)

(52) U.S. Cl.
CPC ............. *H04W 4/14* (2013.01); *H04W 24/08* (2013.01); *H04W 88/08* (2013.01)

(58) Field of Classification Search
CPC ........ H04W 4/14; H04W 24/08; H04W 88/08
See application file for complete search history.

(56) References Cited

U.S. PATENT DOCUMENTS

| 9,628,994 B1* | 4/2017 | Gunyel ................. H04W 12/12 |
| 2005/0020289 A1 | 1/2005 | Kim et al. |

(Continued)

FOREIGN PATENT DOCUMENTS

| CN | 103763690 A | 4/2014 |
| CN | 104683965 A | 4/2014 |

(Continued)

OTHER PUBLICATIONS

Extended European Search Report issued in corresponding EP Application No. 17171384 dated Sep. 20, 2017, 8 pages.

(Continued)

*Primary Examiner* — Qun Shen
(74) *Attorney, Agent, or Firm* — Arch & Lake LLP

(57) ABSTRACT

The present disclosure relates to methods and devices for identifying short messages received by mobile terminals as being from pseudo base stations, wherein, the method comprises: obtaining feature information of the short message when the mobile terminal receives the short message, wherein the feature information includes content information; judging whether the short message is suspected to be an annoying short message based on the feature information; obtaining, when it is judged that the short message is suspected to be an annoying short message, an operation time of when the mobile terminal performed a cell reselection operation with a location area update, wherein the operation time is closest in time to when the mobile terminal received the short message; determining whether the short message is an annoying short message from a pseudo base station based on the operation time. In the technical feature, information security of user terminals may be enhanced.

15 Claims, 12 Drawing Sheets

(56) References Cited

U.S. PATENT DOCUMENTS

| | | | | |
|---|---|---|---|---|
| 2011/0294478 | A1* | 12/2011 | Trivi | H04M 3/436 455/415 |
| 2012/0324019 | A1* | 12/2012 | Ordogh | H04M 3/5335 709/206 |
| 2015/0156300 | A1* | 6/2015 | Park | H04M 1/663 455/414.1 |
| 2015/0281153 | A1* | 10/2015 | Murtagh | H04L 51/12 709/206 |
| 2016/0014151 | A1* | 1/2016 | Prakash | H04L 63/1483 726/22 |
| 2016/0036842 | A1* | 2/2016 | Lee | H04L 63/1416 726/4 |
| 2017/0171129 | A1* | 6/2017 | Hardee | H04L 51/18 |
| 2017/0262853 | A1* | 9/2017 | Williamson | G06Q 20/4016 |

FOREIGN PATENT DOCUMENTS

| | | |
|---|---|---|
| CN | 104244250 A | 12/2014 |
| CN | 104244253 A | 12/2014 |
| CN | 104683965 A | 6/2015 |
| CN | 104902482 A | 9/2015 |
| CN | 105163296 A | 12/2015 |
| CN | 105263142 A | 1/2016 |
| CN | 105430653 A | 3/2016 |
| CN | 105488031 A | 4/2016 |
| CN | 105554764 A | 5/2016 |
| EP | 2661113 A1 | 11/2013 |

OTHER PUBLICATIONS

International Search Report issued in corresponding PCT Application No. PCT/CN2016/094705, dated Jul. 2, 2017, 10 pages.

First Office Action issued in corresponding Chinese Application No. 201610350262.X, dated Dec. 25, 2017, 7 pages.

Notice of Allowance issued in corresponding Chinese Application No. 201610350262.X dated Apr. 4, 2018, 4 pages.

* cited by examiner

METHOD AND DEVICE FOR IDENTIFYING SHORT MESSAGES FROM PSEUDO BASE STATIONS

CROSS-REFERENCE TO RELATED APPLICATION

This application is based on and claims priority to Chinese Patent Application No. 201610350262.X filed on May 24, 2016, which is incorporated herein by reference in its entirety.

FIELD

The present disclosure generally relates to the technical field of mobile communication terminals, and more particularly to a method and a device for identifying unauthorized messages from pseudo base stations.

BACKGROUND

In a cellular mobile communication system, in order to achieve better service, a mobile communications terminal (such as a mobile phone) may search nearby cell signals when in an idle mode, and the terminal may select a cell site (e.g., a base transceiver station) with which to connect based on the strength of cell signals of the cell site. Each cell site may broadcast a location area (i.e., coverage area, which may be identified by a number) to which the cell site belongs in a system broadcast message. When the cell site selected by the terminal belongs to (i.e., corresponds with) a new location area, the mobile terminal may initiate a location update process to report the change in location area, together with the location area number of the cell site with which the mobile terminal was previously connected, to the network.

A "pseudo base station" is an "illegal" cell site (i.e., a cell site that is not directly or indirectly authorized by the user for connection to the mobile terminal, and which may or may not be in violation of applicable laws and regulations) that is not in the mobile communication network of the user's telecom operator. Some pseudo base stations are set up to seek connections with mobile terminals within range so that the pseudo base station can feed short "annoying" messages (i.e., undesirable messages like advertisements, scamming or phishing messages, spam, malware, etc.) to the terminals. The annoying messages are normally "short" (i.e., limited in quantity of text and/or size of images) for greater effectiveness: shorter messages are more easily transmitted to mobile terminals (i.e., are transferred in less time and/or require less bandwidth), and do not require as much of the user's time to impart the information contained in the message (before the user decides that the message should be ignored and/or discarded). To induce mobile terminals to select it, the pseudo base station may enhance its transmission power so that it has stronger signal strength relative to other cell sites and is thus more likely to be selected by mobile terminals in its coverage area (i.e., within range). Once a mobile terminal has connected to the pseudo base station (and updated its location area with the network), the "pseudo base station" may transmit unauthorized and unsolicited short messages with undesirable content to the mobile terminal.

SUMMARY

Embodiments of the present disclosure provide methods and devices for identifying short messages transmitted from pseudo base stations to mobile communications terminals. The technical solutions include the following.

According to a first aspect of the present disclosure, a method for identifying a short message is provided, comprising: obtaining feature information of the short message when a mobile terminal receives the short message, wherein the feature information includes at least content information; judging whether the short message is a suspected annoying short message according to the feature information; obtaining, when it is judged that the short message is the suspected annoying short message, operation time of the mobile terminal performing a cell reselection operation with a location area update, wherein the operation time is closest to time of the mobile terminal receiving the short message; determining whether the short message is an annoying short message from a pseudo base station based on the operation time.

According to a second aspect of the present disclosure, a device for identifying a short message is provided, comprising: a first obtaining module configured to obtain feature information of the short message when a mobile terminal receives the short message, wherein the feature information includes at least content information; a judgment module configured to judge whether the short message is a suspected annoying short message based on the feature information; a second obtaining module configured to obtain, when it is judged that the short message is the suspected annoying short message, operation time of the mobile terminal performing a cell reselection operation with a location area update, wherein the operation time is closest to time of the mobile terminal receiving the short message; a determination module configured to determine whether the short message is an annoying short message from a pseudo base station based on the operation time.

According to a third aspect of the present disclosure, a device for identifying a short message is provided, comprising: a processor; a memory for storing processor-executable instructions; wherein the processor is configured to: obtain feature information of the short message when a mobile terminal receives the short message, wherein the feature information includes at least content information; judge whether the short message is a suspected annoying short message according to the feature information; obtain, when it is judged that the short message is the suspected annoying short message, operation time of the mobile terminal performing a cell reselection operation with a location area update, wherein the operation time is closest to time of the mobile terminal receiving the short message; determine whether the short message is an annoying short message from a pseudo base station based on the operation time.

According to a fourth aspect of the present disclosure, a computer-readable medium is provided, the computer-readable medium being readable by a computer and having recorded thereon a computer program including instructions for executing the steps of a method for identifying a short message according to the first aspect of the present disclosure.

It is to be understood that the forgoing general description and the following detailed description are illustrative only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of example embodiments of the present disclosure.

DETAILED DESCRIPTION

Reference will now be made in detail to example embodiments, potential implementations of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

Figure 1:
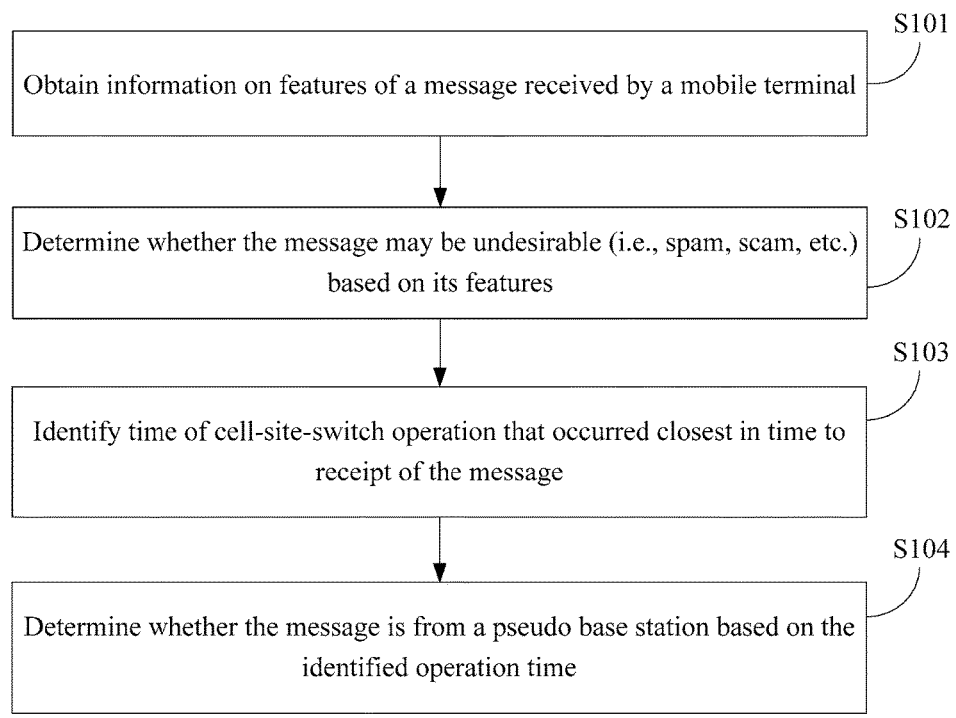
FIG. 1 is a flow diagram illustrating a method for identifying a short message according to an exemplary embodiment.

Embodiments of the present disclosure provide a method for identifying a short message which may have been transmitted to a mobile communications terminal by a pseudo base station. As shown in FIG. 1, the method may include steps S101 to S104.

In step S101, when a mobile terminal receives a short message, information on the features of the short message may be identified or otherwise acquired, including information on the content of the message. This may involve, for example, the mobile terminal analyzing the message and extracting identifying information corresponding with the message (such as the type of message and its size) and its content (such as text and/or images contained in the message).

The feature information of the short message may thus be content of the short message. For example, the short message may be a text message, and the feature information may be content of the text message.

In step S102, it is determined whether the short message is suspected of being an annoying short message based on the feature information.

Whether the short message is an annoying short message may be preliminarily judged based on the content of the short message. For example, whether the content of the short message includes swindle schemes (scams) or otherwise undesirable content such as unsolicited advertisements, requests for remitting payment or personal financial information (e.g., phishing messages) and the like may be judged based on, for example, words, phrases, patterns, and other cues in text or images associated with (or otherwise suggestive of) undesirable content.

In step S103, when it is judged that the short message is suspected to be an annoying short message, it is determined when the mobile terminal performed a cell site reselection operation with an associated location area update to the network around the time the message was received. The operation time of a cell site reselection is closest in time to the time that the mobile terminal received the short message. For example, it may be determined (1) when the mobile terminal last switched cell sites before the short message was received, and (2) when the mobile terminal first switched cell sites after the short message was received.

Whether the terminal performs two cell-site switch operations during a preset time period before and after receiving the short message may be determined using, for example, the times of location area updates (transmitted by the mobile terminal to the network) corresponding with the cell-site switch operations. Comparing the time the short message was received with a first time of the mobile terminal's last performing the cell reselection operation with a location area update before receiving the short message, and a second time of the mobile terminal's first performing the cell reselection operation with a location area update after receiving the short message, allows the system to determine, for example, how long the mobile terminal was connected to the pseudo base station that transmitted the suspected message, and how long it took the pseudo base station to transmit its message to the mobile terminal once a connection was established. From this, it can be determined, for example whether the mobile terminal was only briefly connected with the pseudo base station before the message was received, or before another cell site selection operation. An assessment of whether the short message is from the pseudo base station may be based on the result of the determination.

In step S104, whether the short message is the annoying short message from the pseudo base station may be determined based on the operation time.

In the embodiment, when the mobile terminal receives the short message, whether the short message is the suspected annoying short message may be judged according to the feature information of the short message, such as the content of the short message; and when it is judged that the short message is the suspected annoying short message, whether the short message is the annoying short message from the pseudo base station may be determined according to time of performance of the cell reselection with a location area update before and after receiving the short message. Such that, whether the short message is received from the pseudo base station may be automatically judged, and information security of user mobile terminal may be enhanced.

Figure 2:
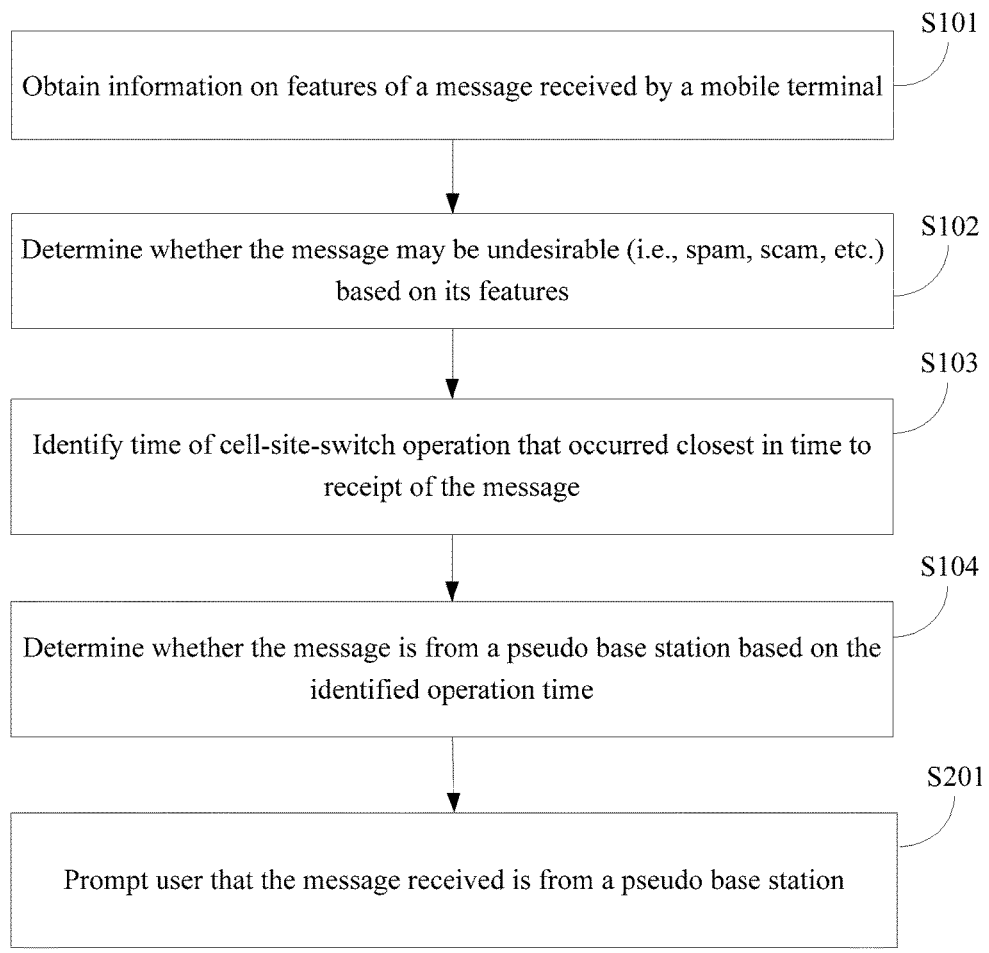
FIG. 2 is a flow diagram illustrating another method for identifying a short message according to an exemplary embodiment.

As shown in FIG. 2, in one or more embodiments, the above method may further include step S201.

In step S201, prompt information may be outputted when it is determined that the short message is from the pseudo base station.

In the embodiment, when it is determined that the short message received by the terminal is the annoying short message from the pseudo base station, the prompt information may be outputted to inform the user of the source of the message. For example, the prompt may include a message such as "the received text message is a solicitation or scam text message from a pseudo base station." The user, informed of the source of the text message, can react accordingly (such as ignoring or deleting the message). Therefore, the information security of the terminal may be enhanced, and swindle schemes may be avoided.

Figure 3:
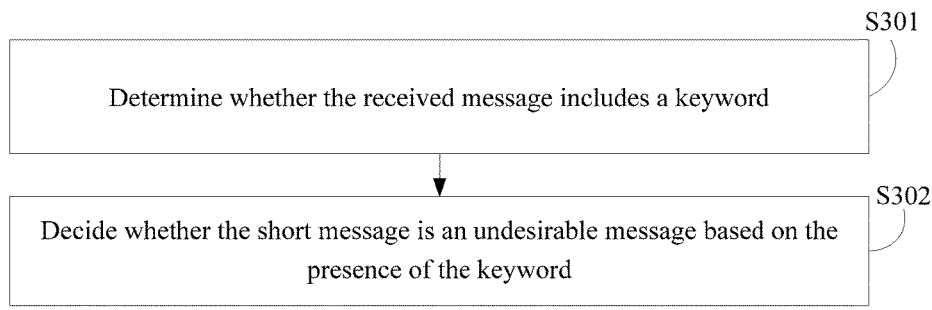
FIG. 3 is a flow diagram illustrating step S102 of a method for identifying a short message according to an exemplary embodiment.

As shown in FIG. 3, in one or more embodiments, when the feature information includes the content information, the above step S102 may include steps S301-S302.

In step S301, whether the content information includes a preset keyword (i.e., a word, phrase, wording pattern, etc.) may be judged.

In step S302, if it is judged that the content information includes the preset keyword, it may be determined that the short message is the suspected annoying short message.

In the embodiment, when the feature information of the short message is content information, whether the content information includes a preset keyword may be determined. For example, if the short message is found to include a preset keyword such as a request for personal information, advertising language and the like, the short message may be judged to be the suspected annoying short message.

Figure 4:
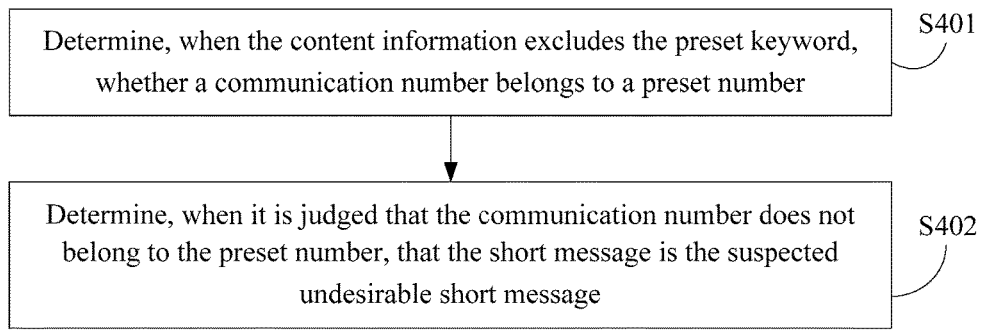
FIG. 4 is a flow diagram illustrating step S102 of another method for identifying a short message according to an exemplary embodiment.

As shown in FIG. 4, in one or more embodiments, the feature information further may include a communication number of a sender of the short message, in which case the above step S102 may further include steps S401 to S402.

In step S401, when the content information excludes the preset keyword, it is determined whether the communication number in the feature information of the message corresponds with a preset number, which may be, for example, a number, range of numbers, or number scheme (such as a certain number of digits and use of letters and numbers in each position).

In step S402, when it is judged that the communication number does not belong to the preset number, it may be determined that the short message is the suspected annoying short message.

In the embodiment, the feature information may be the communication number of the sender of the short message. The sender's communication number can be information that is not part of the content of the message, but rather identifying or classifying information contained in the message (as metadata, for example). When the feature information includes the communication number, and when it is determined that the content information excludes the preset keyword, whether the communication number is the preset number may be judged. For example, the communication number may be a public number of a government agency, a telecom operator, or a bank, and may be used by pseudo base stations to swindle users. The user or the manufacturer may identify such a number (such as the public number of a government agency, a telecom operator, or a bank) as the preset number.

Figure 5A:
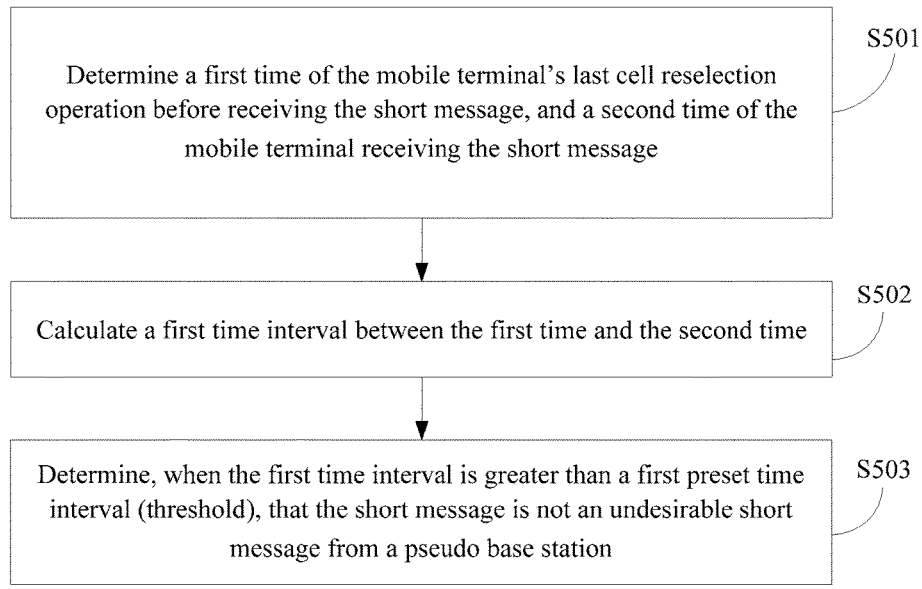
FIG. 5A is a flow diagram illustrating step S104 of a method for identifying a short message according to an exemplary embodiment.

As shown in FIG. 5A, in one or more embodiments, the above step S104 may further include steps S501 to S503.

In step S501, a first time and a second time may be determined, wherein the first time may be time of the mobile terminal's last performing the cell reselection operation with a location area update before receiving the short message, and the second time may be time of the mobile terminal receiving the short message.

In step S502, a first time interval between the first time and the second time may be calculated.

In step S503, when the first time interval is greater than a first preset time interval, it may be determined that the short message is not the annoying short message from the pseudo base station. This may be because a pseudo base station is less likely to wait a long time before sending an undesirable message once it has connected with a mobile terminal, as the mobile terminal may, for example, move out of the pseudo base station's range, or may identify another (legitimate) base station with stronger signal strength and disconnect from the pseudo base station, before the message is sent.

In the embodiment, it may be determined whether the terminal performs a location update during a preset time period before receiving the short message based on the first time (i.e., the time of the mobile terminal's last performing the cell reselection operation with a location area update before receiving the short message) and the second time (i.e., the time of the mobile terminal receiving the short message). Namely, whether the mobile terminal is only briefly connected with the pseudo base station (before the short message is received) may be determined, such that whether the short message is the annoying short message may be decided based on the result of the determination.

Figure 5B:
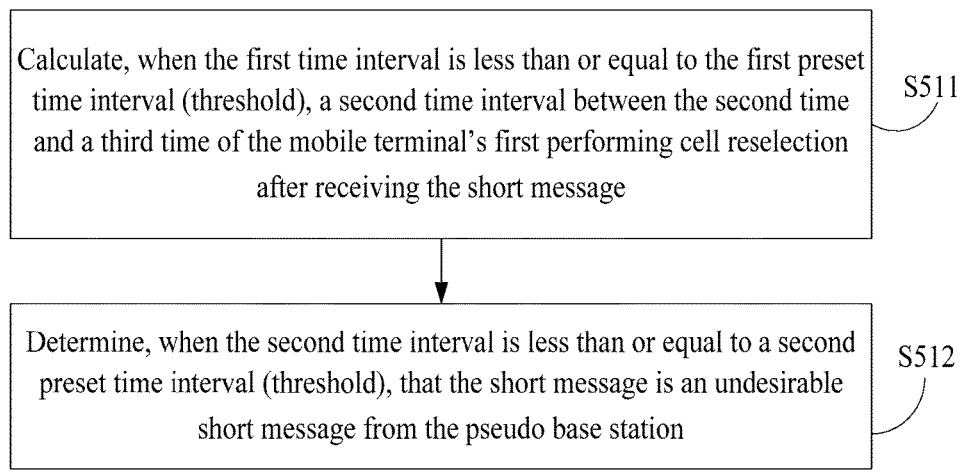
FIG. 5B is a flow diagram illustrating step S104 of another method for identifying a short message according to an exemplary embodiment.

As shown in FIG. 5B, in one or more embodiments, the above step S104 may further include steps S511 to S512.

In step S511, when the first time interval is less than or equal to the first preset time interval, a second time interval between the second time and a third time may be calculated, wherein the third time is time of the mobile terminal's first performing the cell reselection operation with a location area update after receiving the short message.

In step S512, when the second time interval is less than or equal to a second preset time interval, it may be determined that the short message is the annoying short message from the pseudo base station. Another base station (different from a potential pseudo base station) may be selected shortly after a short message is received if, for example, the mobile terminal determines that the base station with which it has connected is not legitimate.

In the embodiment, when it is determined that the short message is suspected to be an undesirable short message, whether the short message is from the pseudo base station may be determined based on the first time, the second time, and the third time. For example, the second time (i.e., the time of the terminal receiving the short message) may be determined, and a first time interval between the second time and the first time (i.e., the time of the mobile terminal's last performing the cell reselection with a location area update before receiving the short message) may be calculated. If the calculated time interval is less than or equal to the first preset time interval, it means that the terminal performed the cell reselection operation with a location area update shortly before receiving the short message, and the short message should be further evaluated. Otherwise it means that the terminal has not performed the cell reselection process with a location area update for a certain amount of time, and the received short message is not information from the pseudo base station. When performing further evaluation, whether the terminal performs the cell reselection with a location area update once again within a certain amount of time after receiving the short message may be judged. If the judgment result is yes, it means that the terminal performed the cell reselection with a location area update shortly after receiving the short message. Namely, it may be determined that the short message is the annoying short message from the pseudo base station if another cell site was selected within a relatively short time period (e.g., one minute).

Figure 6A:
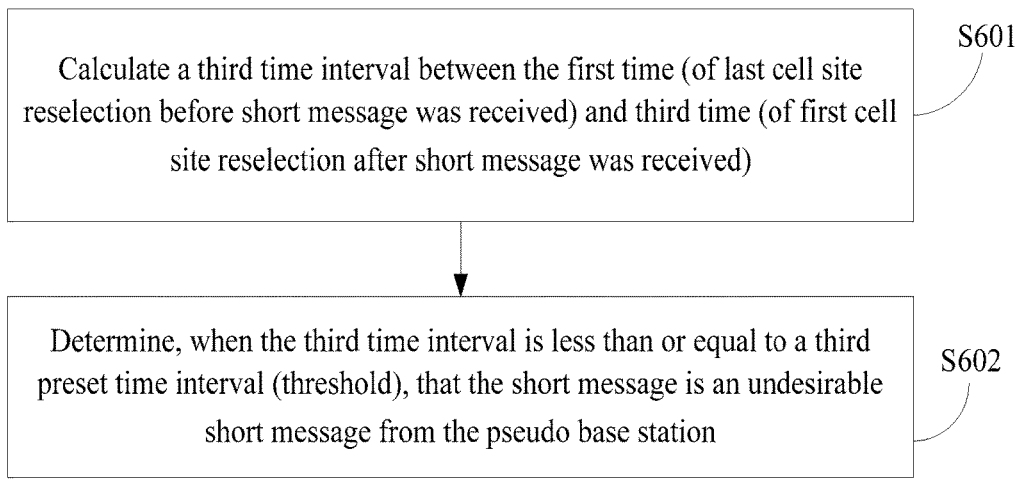
FIG. 6A is a flow diagram illustrating step S104 of another method for identifying a short message according to an exemplary embodiment.

As shown in FIG. 6A, in one or more embodiments, the above method S104 may further include steps S601 to S602.

In step S601, a third time interval between first time and third time may be calculated, wherein the first time is time of the mobile terminal's last performing the cell reselection operation with a location area update before receiving the short message, and the third time is time of the mobile terminal's first performing the cell reselection operation with a location area update after receiving the short message.

In step S602, when the third time interval is less than or equal to a third preset time interval, it may be determined that the short message is the annoying short message from the pseudo base station. This may be the case when a mobile terminal only remains connected with a base station for a short time because, for example, the terminal disconnects from a base station that does not confirm its legitimacy, or the pseudo base station disconnects from a mobile terminal after transmitting a short message so that it is free to quickly establish a connection with (and transmit short messages to) other mobile terminals that enter its coverage area.

In the embodiment, when it is determined that the short message is the suspected annoying short message, the time interval between the first time (i.e., the time of the mobile terminal's last performing the cell reselection operation with a location area update before receiving the short message) and the second time (i.e., the time of the mobile terminal's first performing the cell reselection operation with a location area update after receiving the short message) may be calculated. If the time interval is less than or equal to the third preset time interval, that is, the time interval is fairly short, it means that the terminal performs the cell reselection with a location area update soon after the base station is first selected and the short message is received. Namely, it may be determined that the short message is the annoying short message from the pseudo base station.

In the following, the technical feature of the present invention may be described in detail in a specific embodiment.

Figure 6B:
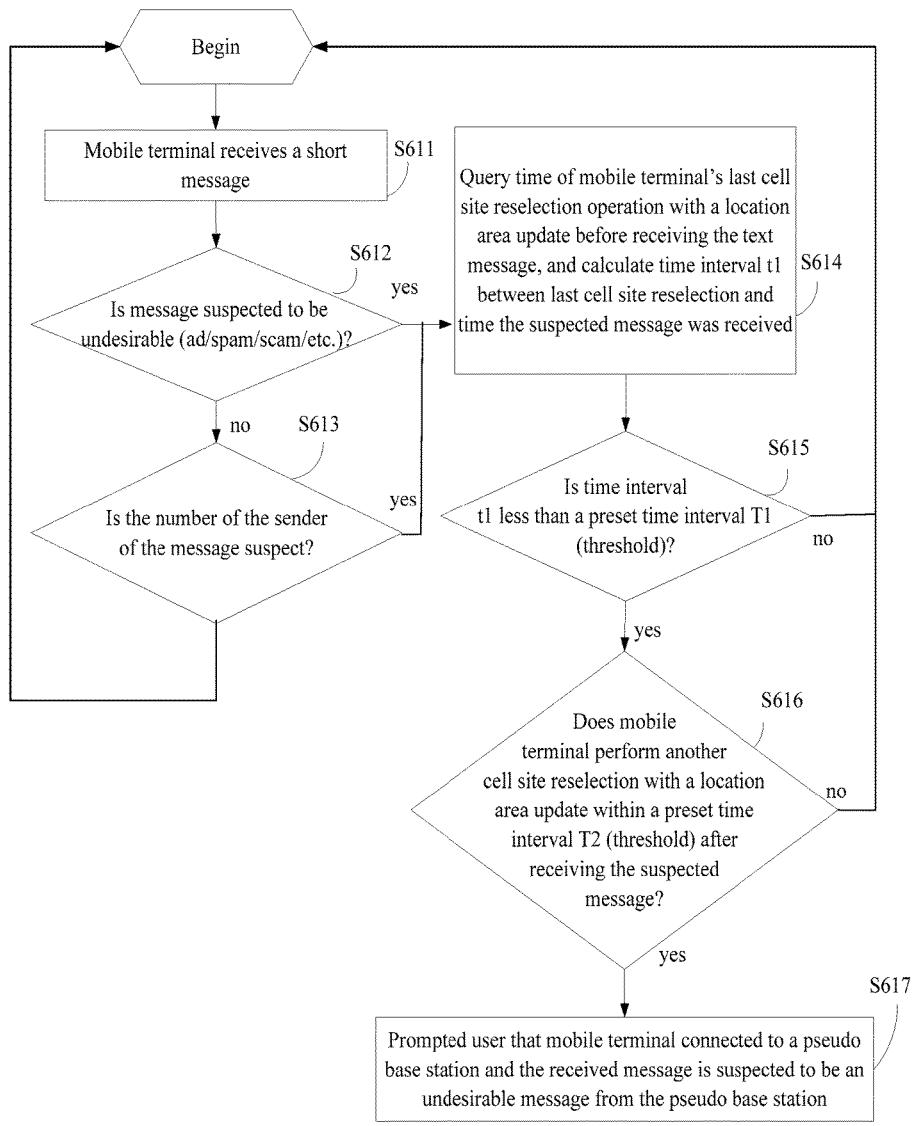
FIG. 6B is a specific flow diagram illustrating a method for identifying a short message according to an exemplary embodiment.

As shown in FIG. 6B, the embodiments of the disclosure provide a method for identifying a short message, which particularly includes the following steps S611 to S617.

In step S611, a mobile terminal may receive a short message, such as a text message.

In step S612, when the text message is received, whether the received text message is suspected to be an undesirable message (i.e., spam, phishing or scam message, etc.) may be judged. For example, it may be determined whether the content of the text message includes swindle content such as advertisements, requests for remitting payment, and the like. If the suspected content is present in the text message, then step S614 may be performed, otherwise step S613 may be performed.

In step S613, whether the number of the sender of the text message is suspected may be judged. For example, it can be determined whether the number of the sender of the text message is a public number of a government agency, a telecom operator, or a bank, such that the pseudo base station using the public number to swindle may be avoided. If the number of the sender of the text message is suspected, then step S614 may be performed, otherwise it may be determined that the content of the text message and the number of the sender of the text message are normal, and the subsequent judgment process may be stopped.

In step S614, the time that the mobile terminal last performed the cell reselection operation with a location area update before receiving the text message may be queried, and the time interval between the foregoing time of the mobile terminal's last performing the cell reselection operation and the time that the suspected text message is received may be calculated, wherein the time interval is denoted as t1.

In step S615, whether the time interval t1 is less than a preset time interval T1 (a threshold length of time, such as 10 seconds to three minutes) may be judged. If the time interval t1 is less than the preset time interval T1, it means that the mobile terminal performed the cell site reselection operation with a location area update not long before receiving the suspected information, and the text message should be further judged. Otherwise it means that the terminal has not performed the cell reselection process with a location area update for a minimum time period, and the received information is deemed not to be from the pseudo base station, and the process may be stopped.

In step S616, whether the mobile terminal performs the cell reselection with a location area update during a preset time interval T2 after receiving the suspected text message of the pseudo base station may be judged. If so, it may be determined that the text message received by the mobile terminal is the annoying text message from the pseudo base station.

In step S617, the user may be prompted that the mobile terminal has resided in (i.e., has been in communication with) a pseudo base station not long ago and the received text message is the annoying text message from the pseudo base station.

In the above technical feature, whether the short message is from the pseudo base station may be automatically judged, and the information security of the user terminal may be enhanced.

The following is an example device which may be used to perform the method in the embodiments of the present disclosure.

Figure 7:
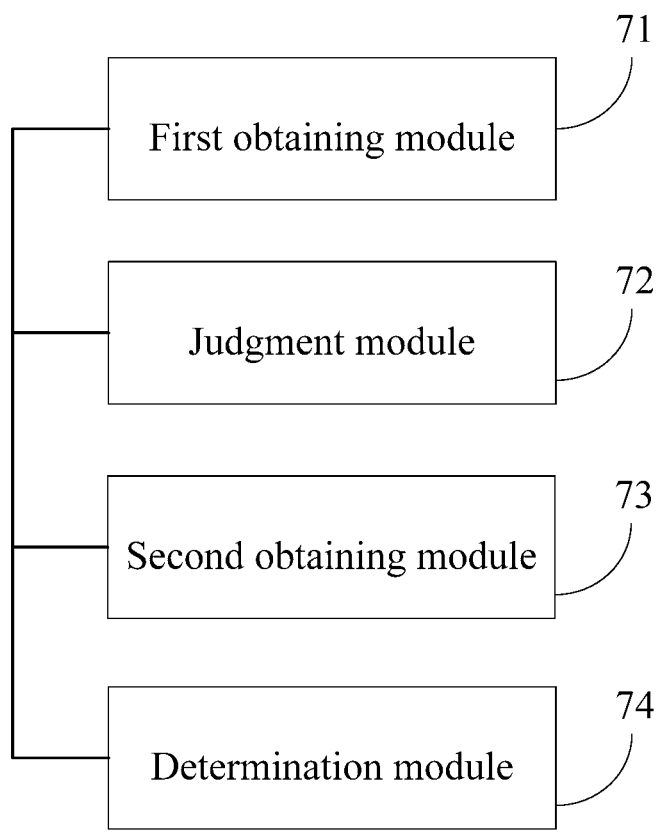
FIG. 7 is a block diagram illustrating a device for identifying a short message according to an exemplary embodiment.

FIG. 7 is a block diagram illustrating a device for identifying a short message according to an exemplary embodiment. The device may be implemented as part or all of an electronic device via software, hardware, or the combination thereof. As shown in FIG. 7, the device for identifying a short message may include: a first obtaining module 71 configured to obtain feature information of the short message when a mobile terminal receives the short message, wherein the feature information includes at least content information; a judgment module 72 configured to judge whether the short message is a suspected annoying short message according to the feature information; a second obtaining module 73 configured to obtain, when it is judged that the short message is the suspected annoying short message, operation time of the mobile terminal performing a cell reselection operation with a location area update, wherein the operation time is closest to time of the mobile terminal receiving the short message; a determination module 74 configured to determine whether the short message is an annoying short message from a pseudo base station based on the operation time.

In the embodiment, when the mobile terminal receives the short message, whether the short message is the suspected annoying short message may be judged according to the feature information of the short message, such as the content of the short message; and when it is judged that the short message is the suspected annoying short message, whether the short message is the annoying short message from the pseudo base station may be determined according to time of performing the cell reselection with a location area update before and after receiving the short message. Such that, whether the short message is received from the pseudo base station may be automatically judged, and the information security of the user terminal may be enhanced.

Figure 8:
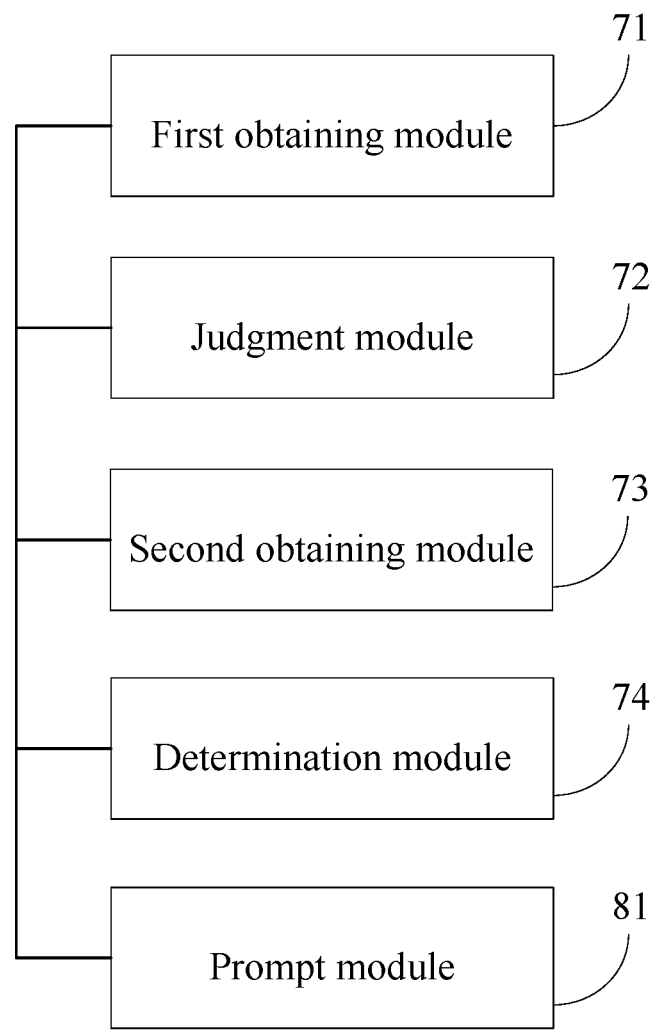
FIG. 8 is a block diagram illustrating another device for identifying a short message according to an exemplary embodiment.

As shown in FIG. 8, in one or more embodiments, the above device may further include a prompt module 81 configured to output prompt information when it is determined that the short message is the annoying short message from the pseudo base station.

In the embodiment, when it is determined that the short message received by the terminal is the annoying short message from the pseudo base station, the prompt information may be outputted to prompt the user, such as prompt information of "the received text message is an annoying text message from a pseudo base station" may be outputted. Such that, the user may be aware of the source of the text message, and take the source into consideration (in deciding, e.g., to ignore or delete the message). Therefore, the information security of the terminal may be enhanced, and swindle schemes may be more easily avoided.

Figure 9:
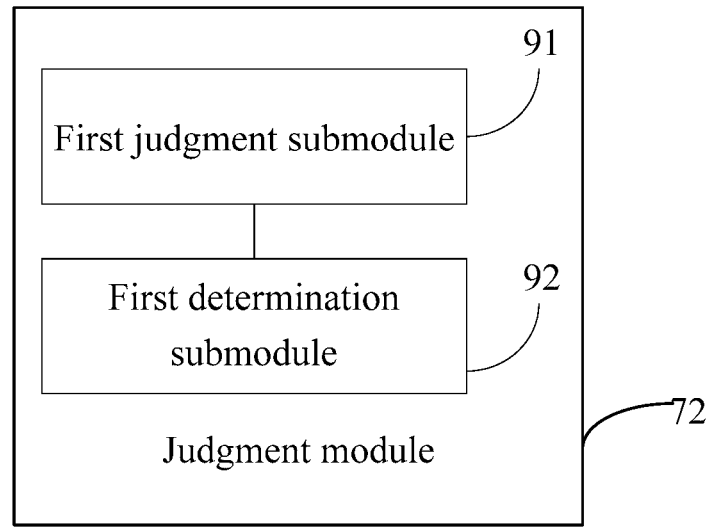
FIG. 9 is a block diagram illustrating a judgment module of a device for identifying a short message according to an exemplary embodiment.

As shown in FIG. 9, in one or more embodiments, when the feature information includes the content information, the judgment module 72 may include: a first judgment submodule 91 configured to judge whether the content information includes a preset keyword; a first determination submodule 92 configured to determine, when it is judged that the content information includes the preset keyword, that the short message is the suspected annoying short message.

In the embodiment, when the feature information of the short message is content information, whether the content information includes a preset keyword may be judged. For example, whether the short message includes a preset keyword such as a request a payment remission, advertising language and the like may be judged, such that whether the short message is the suspected annoying short message may be determined based on the judgment result.

Figure 10:
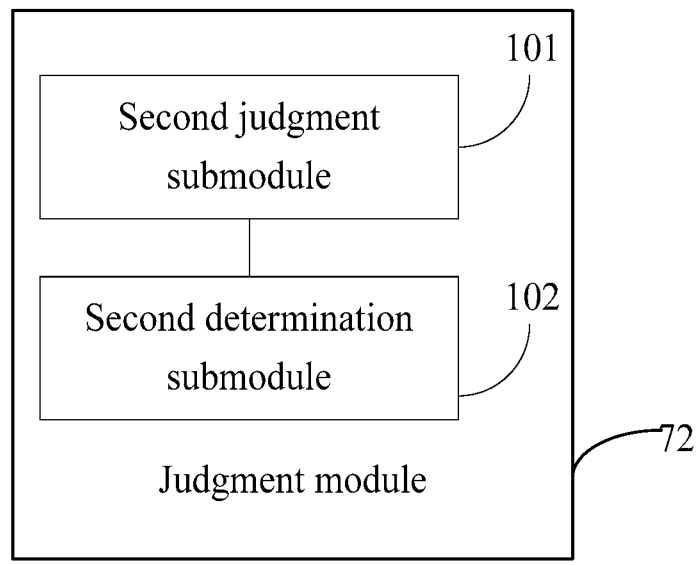
FIG. 10 is a block diagram illustrating a judgment module of another device for identifying a short message according to an exemplary embodiment.

As shown in FIG. 10, in one or more embodiments, the feature information may further include a communication number of a sender of the short message, the judgment module 72 may further include: a second judgment submodule 101 configured to judge, when the content information excludes the preset keyword, whether the communication number belongs to a preset number; a second determination submodule 102 configured to determine, when it is judged that the communication number does not belong to the preset number, that the short message is the suspected annoying short message. The communication number may, for example, identify a base station or source of the message, which can be cross-referenced with a list of legitimate or illegitimate sources.

In the embodiment, the feature information may be the communication number of the sender of the short message besides the content information. When the feature information includes the communication number, and when it is judged that the content information excludes the preset keyword, whether the communication number is the preset number may be judged. For example, whether the communication number is a public number of a government agency, a telecom operator, or a bank may be judged, such that the pseudo base station using the public number to swindle may be avoided. The user and the manufacturer may preset the public number of a government agency, a telecom operator, or a bank as the preset number. This might suggest, for example, that the sender/source is attempting to appear legitimate when it is not.

Figure 11:
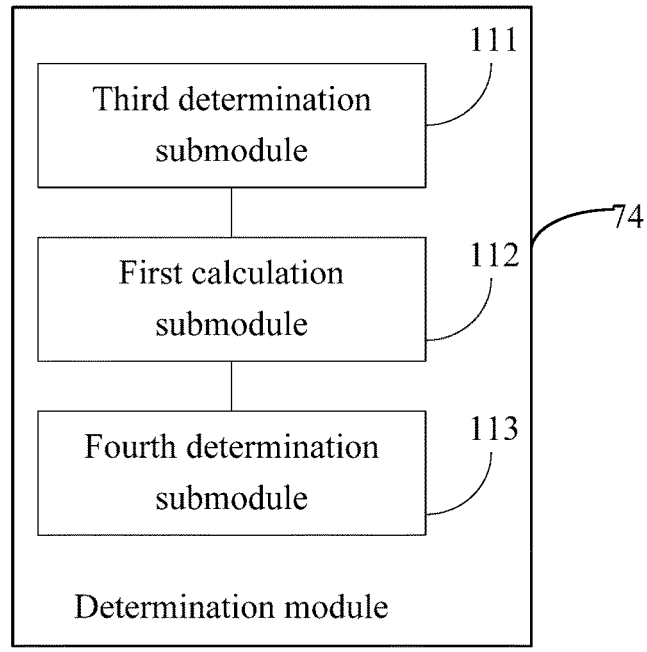
FIG. 11 is a block diagram illustrating a determination module of a device for identifying a short message according to an exemplary embodiment.

As shown in FIG. 11, in one or more embodiments, the determination module 74 may include: a third determination submodule 111 configured to determine a first time and a second time, wherein the first time is time of the mobile terminal's last performing the cell site reselection operation with a location area update before receiving the short message, the second time is the time the mobile terminal received the short message; a first calculation submodule 112 configured to calculate a first time interval between the first time and the second time; a fourth determination submodule 113 configured to determine, when the first time interval is greater than a first preset time interval (i.e., a threshold of, e.g., one minute), that the short message is not the annoying short message from the pseudo base station.

In the embodiment, whether the terminal performs a location update during a preset time period before receiving the short message according to the first time (of the mobile terminal's last performing the cell site reselection operation with a location area update before receiving the short message) and the second time (of the mobile terminal receiving the short message). Namely, whether the mobile terminal is only briefly connected with the pseudo base station may be determined, such that whether the short message is the annoying short message may be determined based on the result of the determination.

Figure 12:
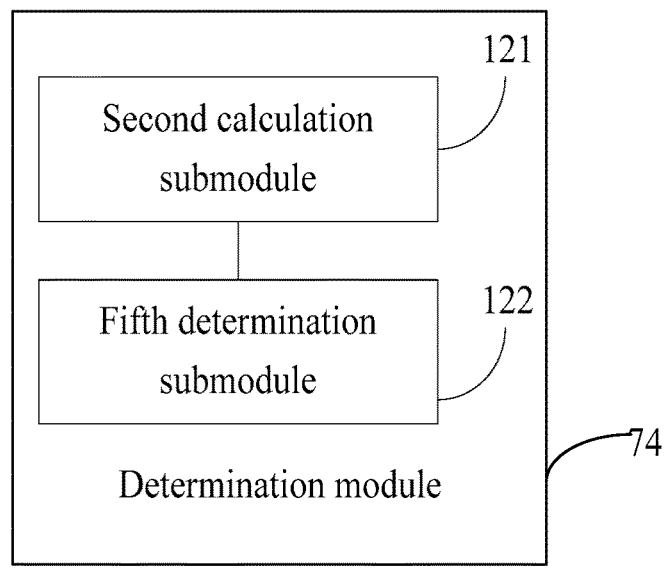
FIG. 12 is a block diagram illustrating a determination module of another device for identifying a short message according to an exemplary embodiment.

As shown in FIG. 12, in one or more embodiments, the determination module 74 may further include: a second calculation submodule 121 configured to calculate, when the first time interval is less than or equal to the first preset time interval, a second time interval between the second time and a third time, wherein the third time is time of the mobile terminal's first performing a cell reselection operation with a location area update after receiving the short message; a fifth determination submodule 122 configured to determine, when the second time interval is less than or equal to a second preset time interval (i.e., a threshold of, e.g., one minute), that the short message is the annoying short message from the pseudo base station.

In the embodiment, when it is determined that the short message is the suspected annoying short message, whether the short message is the annoying short message from the pseudo base station may be determined according to the first time, the second time, and the third time. For example, the second time of the terminal receiving the short message may be determined, and the first time interval between the second time of the terminal receiving the short message and the first time of the mobile terminal's last performing the cell reselection with a location area update before receiving the short message may be calculated. If the time interval is less than or equal to the first preset time interval, it means that the terminal performed the cell reselection operation with a location area update shortly before receiving the short message (such as 15 seconds before), and the short message should be further judged. Otherwise it means that the terminal has not performed the cell reselection process with a location area update for a time period, and the received short message is not information from the pseudo base station. When performing further judgment, whether the terminal performs the cell reselection with a location area update again during a time period after receiving the short message may be judged. If the judgment result is yes, it means that the terminal performed the cell reselection with a location area update within a short time period after receiving the short message. Namely, it may be determined that the short message is the annoying short message from the pseudo base station.

Figure 13:
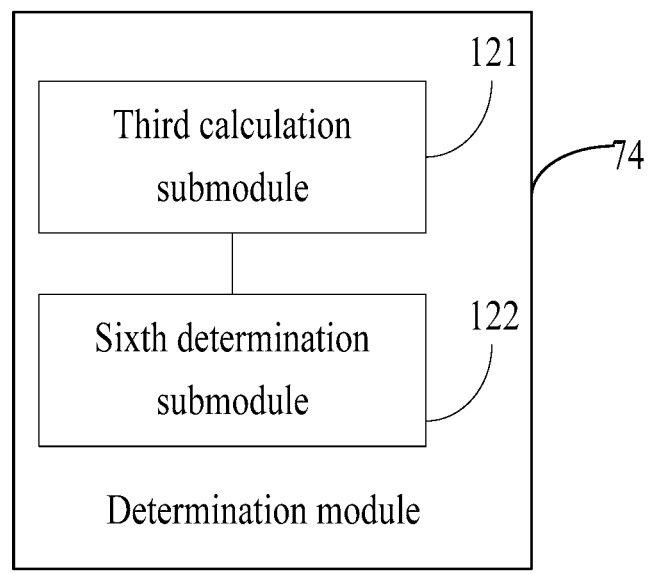
FIG. 13 is a block diagram illustrating a determination module of another device for identifying a short message according to an exemplary embodiment.

As shown in FIG. 13, in one or more embodiments, the determination module 74 may include: a third calculation submodule 131 configured to calculate a third time interval between first time and third time, wherein the first time is time of the mobile terminal's last performing the cell reselection operation with a location area update before receiving the short message, and the third time is time of the mobile terminal's first performing the cell reselection operation with a location area update after receiving the short message; a sixth determination submodule 132 configured to determine, when the third time interval is less than or equal to a third preset time interval, that the short message is the annoying short message from the pseudo base station.

In the embodiment, when it is determined that the short message is the suspected annoying short message, the time interval between the first time of the mobile terminal's last performing the cell reselection operation with a location area update before receiving the short message and the second time of the mobile terminal's first performing the cell reselection operation with a location area update after receiving the short message may be calculated. If the time interval is less than or equal to the third preset time interval (i.e., a threshold, such as two minutes), namely the time interval is fairly short, it means that the terminal performed the cell reselection with a location area update during a relatively short time period after receiving the short message. Namely, it may be determined that the short message is the annoying short message from the pseudo base station.

According to a third aspect of the embodiments of the present disclosure, a device for identifying a short message is provided, comprising: a processor; a memory for storing processor-executable instructions; wherein the processor is configured to: obtain feature information of the short message when a mobile terminal receives the short message, wherein the feature information includes at least content information; judge whether the short message is a suspected annoying short message according to the feature information; obtain, when it is judged that the short message is the suspected annoying short message, operation time of the mobile terminal performing a cell reselection operation with a location area update, wherein the operation time is closest in time to the time of the mobile terminal receiving the short message; determine whether the short message is an annoying short message from a pseudo base station according to the operation time.

The above processor may further be configured to output prompt information when it is determined that the short message is the annoying short message from the pseudo base station.

The above processor may further be configured such that the judge whether the short message is a suspected annoying short message based on the feature information comprises: judging whether the content information includes a preset keyword; determining, when it is judged that the content information includes the preset keyword, that the short message is the suspected annoying short message.

The above processor may further be configured such that the feature information further includes a communication number of a sender of the short message, the judge whether the short message is a suspected annoying short message according to the feature information further comprises: judging, when the content information excludes the preset keyword, whether the communication number belongs to a preset number; determining, when it is judged that the communication number does not belong to the preset number, that the short message is the suspected annoying short message.

The above processor may further be configured such that the determine whether the short message is an annoying short message from a pseudo base station according to the operation time comprises: determining first time and second time, wherein the first time is time of the mobile terminal's last performing the cell reselection operation with a location area update before receiving the short message, the second time is time of the mobile terminal receiving the short message; calculating a first time interval between the first time and the second time; determining, when the first time interval is greater than a first preset time interval, that the short message is not the annoying short message from the pseudo base station.

The above processor may further be configured such that the determine whether the short message is an annoying short message from a pseudo base station according to the operation time comprises: calculating, when the first time interval is less than or equal to the first preset time interval, a second time interval between the second time and a third time, wherein the third time is time of the mobile terminal's first performing the cell reselection operation with a location area update after receiving the short message; determining, when the second time interval is less than or equal to a second preset time interval, that the short message is the annoying short message from the pseudo base station.

The above processor may further be configured such that the determine whether the short message is an annoying short message from a pseudo base station according to the operation time comprises: calculating a third time interval between first time and third time, wherein the first time is time of the mobile terminal's last performing the cell reselection operation with a location area update before receiving the short message, and the third time is time of the mobile terminal's first performing the cell reselection operation with a location area update after receiving the short message; determining, when the third time interval is less than or equal to a third preset time interval, that the short message is the annoying short message from the pseudo base station.

Figure 14:
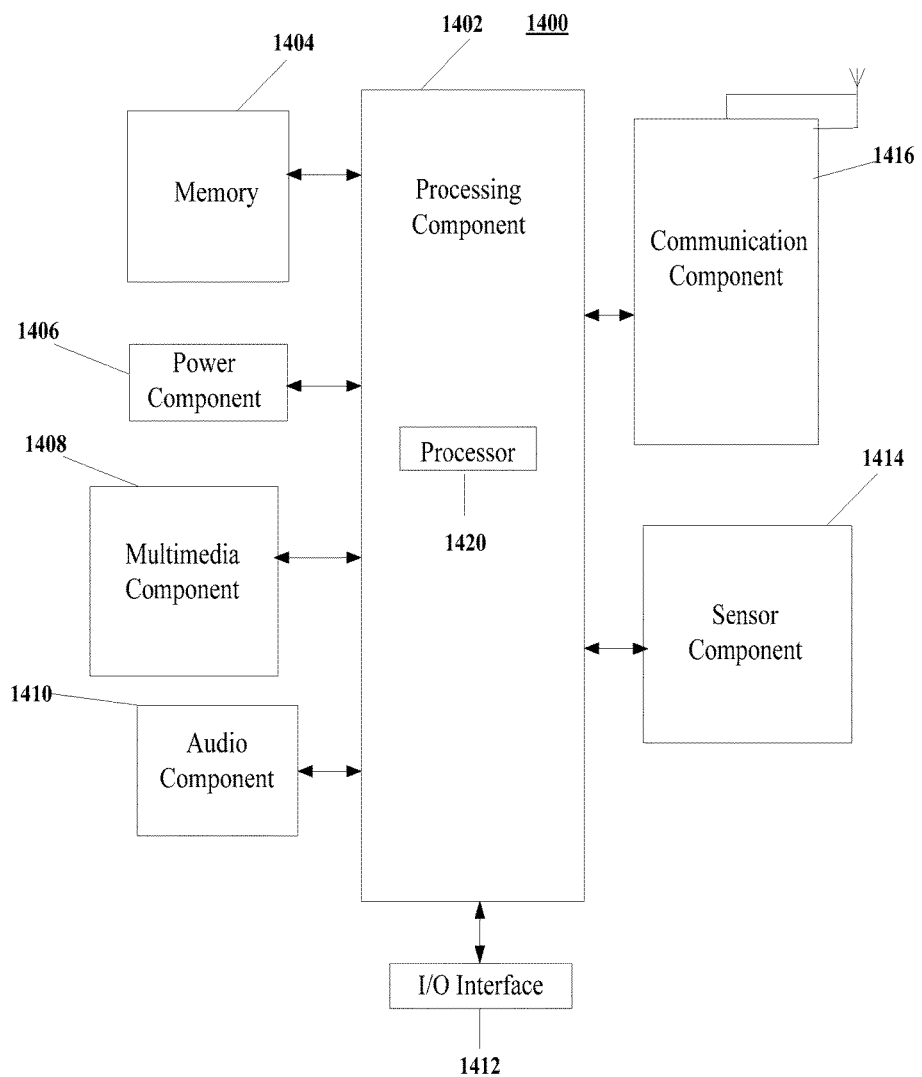
FIG. 14 is a block diagram illustrating a device for identifying a short message according to an exemplary embodiment.

FIG. 14 is a block diagram illustrating a device for identifying a short message according to an exemplary embodiment. For example, the device 1400 may be a mobile phone, a computer, a digital broadcast terminal, a messaging device, a gaming console, a tablet, a medical device, an exercise equipment, a personal digital assistant, and the like.

The device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, data communications, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400, environmental states, times, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but may also sense a period of time and a pressure associated with the touch or swipe action.

The audio component 1410 is configured to output and/or input audio signals. For example, the audio component 1410 includes a microphone ("MIC") configured to receive an external audio signal when the device 1400 is in an operation mode, such as a recording mode and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keypad, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the device 1400 and other devices. The device 1400 can access a wireless network based on a communication standard, such as WiFi, 2G; or 3G; or a combination thereof. In one example embodiment, the communication component 1416 receives a broadcast signal or broadcast associated information from an external broadcast management system via a broadcast channel. In one example embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 1400 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 1400 may use the circuitries in combination with the other hardware or software components for executing the disclosed methods. Each module, submodule, unit, or sub-unit disclosed above may be implemented at least partially using the one or more circuitries.

In example embodiments, there is also provided a non-transitory computer readable storage medium including instructions, such as included in the memory 1404, executable by the processor 1420 in the device 1400, for performing the above-described methods. For example, the non-transitory computer-readable storage medium may be a ROM, a random access memory (RAM), a CD-ROM, a magnetic tape, a floppy disc, an optical data storage device, and the like.

A non-transitory computer readable storage medium having stored therein instructions that, when executed by the processor of the device 1400, causes the device 1400 to perform the above described method for identifying a short message, comprising: obtaining feature information of the short message when a mobile terminal receives the short message, wherein the feature information includes at least content information; judging whether the short message is a suspected annoying short message according to the feature information; obtaining, when it is judged that the short message is the suspected annoying short message, operation time of the mobile terminal performing a cell reselection operation with a location area update, wherein the operation time is closest to time of the mobile terminal receiving the short message; determining whether the short message is an annoying short message from a pseudo base station based on the operation time.

In one or more embodiments, the method further comprises: outputting prompt information when it is determined that the short message is the annoying short message from the pseudo base station.

In one or more embodiments, judging whether the short message is a suspected annoying short message according to the feature information comprises: judging whether the content information includes a preset keyword; determining, when it is judged that the content information includes the preset keyword, that the short message is the suspected annoying short message.

In one or more embodiments, the feature information further includes a communication number of a sender of the short message, judging whether the short message is a suspected annoying short message according to the feature information further comprises: judging, when the content information excludes the preset keyword, whether the communication number belongs to a preset number; determining, when it is judged that the communication number does not belong to the preset number, that the short message is the suspected annoying short message.

In one or more embodiments, determining whether the short message is an annoying short message from a pseudo base station according to the operation time comprises: determining first time and second time, wherein the first time is time of the mobile terminal's last performing the cell reselection operation with a location area update before receiving the short message, the second time is time of the mobile terminal receiving the short message; calculating a first time interval between the first time and the second time; determining, when the first time interval is greater than a first preset time interval, that the short message is not the annoying short message from the pseudo base station.

In one or more embodiments, determining whether the short message is an annoying short message from a pseudo base station according to the operation time comprises: calculating, when the first time interval is less than or equal to the first preset time interval, a second time interval between the second time and a third time, wherein the third time is time of the mobile terminal's first performing the cell reselection operation with a location area update after receiving the short message; determining, when the second time interval is less than or equal to a second preset time interval, that the short message is the annoying short message from the pseudo base station.

In one or more embodiments, determining whether the short message is an annoying short message from a pseudo base station according to the operation time comprises: calculating a third time interval between first time and third time, wherein the first time is time of the mobile terminal's last performing the cell reselection operation with a location area update before receiving the short message, and the third time is time of the mobile terminal's first performing the cell reselection operation with a location area update after receiving the short message; determining, when the third time interval is less than or equal to a third preset time interval, that the short message is the annoying short message from the pseudo base station.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and embodiments be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for identifying a short message received by a mobile terminal as being from a pseudo base station, comprising:
   obtaining feature information for the short message when the mobile terminal receives the short message, wherein the feature information includes at least content information;
   determining whether the short message is suspected to be an undesirable short message based on the feature information;
   obtaining, when it is determined that the short message is suspected to be an undesirable short message, an operation time corresponding to when the mobile terminal performed a cell site reselection operation, wherein the operation time corresponds either to the last reselection operation before the message was received or to a first reselection operation after the short message was received; and
   determining whether the short message is from a pseudo base station based on the operation time,
   wherein determining whether the short message is from the pseudo base station based on the operation time comprises:

determining a first time and a second time, wherein the first time corresponds to the last reselection operation when the mobile terminal last performed a cell site reselection operation with a location area update before receiving the short message, and wherein the second time corresponds to when the mobile terminal received the short message;

calculating a first time interval between the first time and the second time;

when determining that the first time interval is less than or equal to the first preset time interval, calculating a second time interval between the second time and a third time, wherein the third time corresponds to the first reselection operation when the mobile terminal performed a first cell reselection operation after receiving the short message; and determining, when the second time interval is less than or equal to a second preset time interval, that the short message is from the pseudo base station.

2. The method of claim 1, further comprising:

outputting prompt information when it is determined that the short message is from the pseudo base station.

3. The method of claim 1, wherein determining whether the short message is suspected to be an undesirable short message based on the feature information comprises:

determining whether the content information includes a preset keyword; and determining, when it is determined that the content information includes the preset keyword, that the short message is an undesirable short message as suspected.

4. The method of claim 3, wherein the feature information further includes a communication number of a sender of the short message, and wherein determining whether the short message is suspected to be an undesirable short message based on the feature information further comprises:

determining, when the content information excludes the preset keyword, whether the communication number corresponds to a preset number;

determining, when it is determined that the communication number does not belong to the preset number, that the short message is an undesirable short message as suspected.

5. The method of claim 1, wherein determining whether the short message is from a pseudo base station based on the operation time comprises:

determining, when the first time interval is greater than a first preset time interval, that the short message is not from the pseudo base station.

6. The method of claim 5, wherein determining whether the short message is from a pseudo base station based on the operation time further comprises:

calculating, when the first time interval is less than or equal to the first preset time interval, a second time interval between the second time and a third time, wherein the third time corresponds to when the mobile terminal first performed a cell reselection operation after receiving the short message; and determining, when the second time interval is greater than the second preset time interval, that the short message is not from the pseudo base station.

7. The method of claim 1, wherein determining whether the short message is from a pseudo base station based on the operation time comprises:

calculating a third time interval between a first time and a third time, wherein the first time corresponds to when the mobile terminal last performed a cell reselection operation with a location area update before receiving the short message, and the third time corresponds to when the mobile terminal first performed a cell reselection operation with a location area update after receiving the short message;

determining, when the third time interval is less than or equal to a third preset time interval, that the short message is from the pseudo base station.

8. A device for identifying a short message received by a mobile terminal as being from a pseudo base station, comprising:

a processor;

a memory for storing processor-executable instructions;

wherein the processor is configured to:

obtain feature information of a short message when a mobile terminal receives the short message, wherein the feature information includes at least content information;

determining whether the short message is suspected to be an undesirable short message based on the feature information;

obtain, when it is determining that the short message is suspected to be an undesirable short message, an operation time corresponding to when the mobile terminal performed a cell site reselection operation, wherein the operation time corresponds either to the last cell site reselection before the message was received or to a first cell site reselection after the message was received; and determine whether the short message is from a pseudo base station based on the operation time, wherein the processor is further configured to:

determine a first time and a second time, wherein the first time corresponds to the last cell site reselection operation when the mobile terminal last performed a cell site reselection operation with a location area update before receiving the short message, and wherein the second time corresponds to when the mobile terminal received the short message;

calculate a first time interval between the first time and the second time;

when determining that the first time interval is less than or equal to the first preset time interval, calculate a second time interval between the second time and a third time, wherein the third time corresponds to the first cell site reselection operation when the mobile terminal first performed a cell reselection operation after receiving the short message; and determine, when the second time interval is less than or equal to a second preset time interval, that the short message is from the pseudo base station.

9. The device of claim 8, wherein the processor is further configured to:

output prompt information when it is determined that the short message is from the pseudo base station.

10. The device of claim 8, wherein the processor is further configured to:

determine whether the content information includes a preset keyword; and determine, when it is determined that the content information includes the preset keyword, that the short message is an undesirable short message as suspected.

11. The device of claim 10, wherein the feature information further includes a communication number of a sender of the short message, and wherein the processor is further configured to:

determine, when the content information excludes the preset keyword, whether the communication number corresponds to a preset number; and determine, when it is determined that the communication number does not correspond to the preset number, that the short message is an undesirable short message as suspected.

12. The device of claim 8, wherein the processor is further configured to:

determine, when the first time interval is greater than a first preset time interval, that the short message is not the from the pseudo base station.

13. The device of claim 12, wherein the processor is further configured to:

determine, when the second time interval is greater than the second preset time interval, that the short message is not from the pseudo base station.

14. The device of claim 8, wherein the processor is further configured to:

calculate a third time interval between a first time and a third time, wherein the first time corresponds to when the mobile terminal last performed a cell site reselection operation before receiving the short message, and the third time corresponds to when the mobile terminal first performed a cell site reselection operation with a location area update after receiving the short message; and determine, when the third time interval is less than or equal to a third preset time interval, that the short message is from the pseudo base station.

15. A non-transitory computer-readable storage medium readable by a computer and having recorded thereon a computer program including instructions for executing the steps of a method for identifying a short message received by a mobile terminal as being from a pseudo base station, the method comprising:

obtaining feature information for the short message when the mobile terminal receives the short message, wherein the feature information includes at least content information;

determining whether the short message is suspected to be an undesirable short message based on the feature information;

obtaining, when it is determined that the short message is suspected to be an undesirable short message, an operation time corresponding to when the mobile terminal performed a cell site reselection operation, wherein the operation time corresponds either to the last reselection operation before the message was received or to a first reselection operation after the message was received; and determining whether the short message is from a pseudo base station based on the operation time, wherein determining whether the short message is from the pseudo base station based on the operation time comprises:

determining a first time and a second time, wherein the first time corresponds to the last reselection operation when the mobile terminal last performed a cell site reselection operation with a location area update before receiving the short message, and wherein the second time corresponds to when the mobile terminal received the short message;

calculating a first time interval between the first time and the second time;

when determining that the first time interval is less than or equal to the first preset time interval, calculating a second time interval between the second time and a third time, wherein the third time corresponds to the first reselection operation when the mobile terminal first performed a cell reselection operation after receiving the short message; and determining, when the second time interval is less than or equal to a second preset time interval, that the short message is from the pseudo base station.

\* \* \* \* \*